(12) United States Patent
Shirouzu

(10) Patent No.: US 7,265,924 B2
(45) Date of Patent: Sep. 4, 2007

(54) SERVO WRITER WITH MULTIPLE SERVO WRITE HEADS AND A METHOD OF WRITING WITH THE SERVO WRITER

(75) Inventor: Go Shirouzu, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/194,455

(22) Filed: Aug. 2, 2005

(65) Prior Publication Data
US 2006/0092545 A1 May 4, 2006

(30) Foreign Application Priority Data
Aug. 20, 2004 (JP) ............... 2004-241144

(51) Int. Cl.
G11B 15/14 (2006.01)
G11B 21/02 (2006.01)
G11B 5/584 (2006.01)
G11B 5/03 (2006.01)

(52) U.S. Cl. ............ 360/64; 360/75; 360/77.12; 360/66

(58) Field of Classification Search ............ None
See application file for complete search history.

(56) References Cited

U.S. PATENT DOCUMENTS

| | | | |
|---|---|---|---|
| 4,996,609 A | | 2/1991 | Joannou |
| 5,689,384 A | | 11/1997 | Albrecht et al. |
| 6,130,799 A | * | 10/2000 | Sato ............ 360/77.14 |
| 6,347,016 B1 | | 2/2002 | Ishida et al. |
| 6,873,587 B2 | | 3/2005 | Hashimoto |
| 6,970,312 B2 | | 11/2005 | Yip et al. |
| 2003/0231430 A1 | | 12/2003 | Hashimoto |
| 2005/0219734 A1 | | 10/2005 | Rothermel et al. |

FOREIGN PATENT DOCUMENTS

EP    0 690 442 A2    1/1996

OTHER PUBLICATIONS

European Search Report EP 05 01 8096, May 8, 2007.

* cited by examiner

*Primary Examiner*—Andrew L. Sniezek
(74) *Attorney, Agent, or Firm*—Sughrue Mion, PLLC

(57) ABSTRACT

Disclosed is a servo writer in which a servo write head is easy to exchange, and which writes, to magnetic tapes, a servo signal from which a reading signal of the improved SN ratio can be obtained. The servo writer includes a magnetic tape running system, at least one DC erase head, a plurality of servo write heads being arranged downstream of the DC erase head, and an installation section on which the servo write heads are arranged and which includes a switching mechanism for switching the servo write heads to position one of the servo write heads at a location possible to write the servo signals on the magnetic tape.

21 Claims, 9 Drawing Sheets

BACK

FRONT

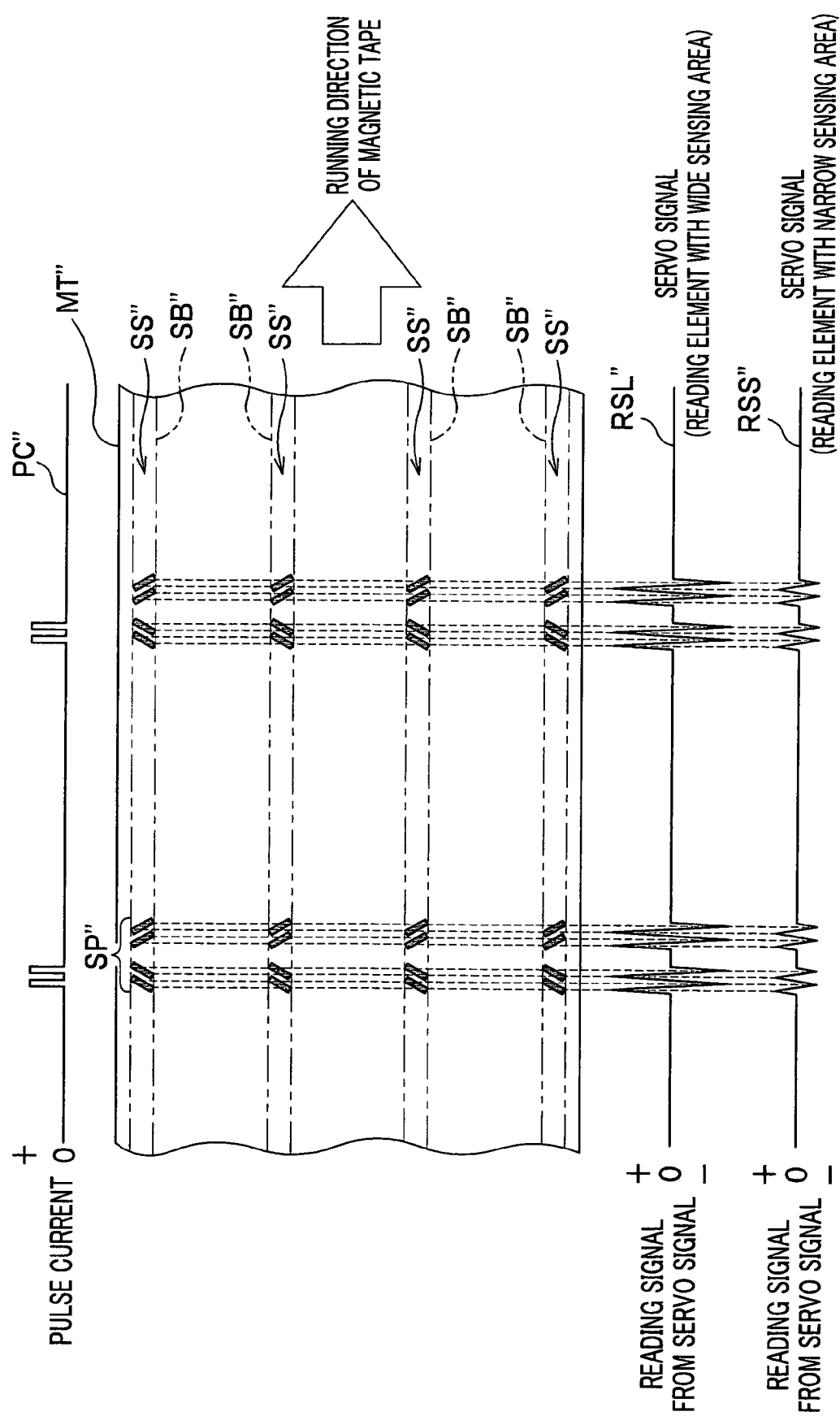

SERVO WRITER WITH MULTIPLE SERVO WRITE HEADS AND A METHOD OF WRITING WITH THE SERVO WRITER

BACKGROUND OF THE INVENTION

1. Field of the Invention

The present invention relates to a servo writer that writes servo signals used for tracking control of magnetic heads to magnetic tapes.

2. Description of the Related Art

In recent years, the recording density of magnetic tapes has increased. Due to this trend, it has been necessary for servo writers that write servo signals to magnetic tapes to be highly accurate. This is because this high level of accuracy is needed to ensure that a servo writer's magnetic head traces track on a magnetic tape precisely. In such a servo writer, servo write heads are required to be exchanged, depending on the servo pattern to be written to a magnetic tape or the type of magnetic tapes. When servo write heads are exchanged, a process of adjusting the head precisely is necessary. Currently, this process is complex and time-consuming.

To overcome this disadvantage, the applicant has proposed a servo writer with a turret on which multiple servo write heads are mounted (see U.S. Pat. No. 6,873,587). In this servo writer, in order to exchange the servo write heads, the turret simply needs to be turned. This servo writer makes it possible to adjust the head without the need for stopping the writer for a long time. This enables much more efficient recording of servo signals on magnetic tapes and, therefore decreases the overall cost.

As for technique for writing servo signals, a servo writer supplies a record current to the servo bands of a magnetic tape, thereby magnetizing them in one direction. As a result, servo signals are written to the servo bands. Specifically, as shown in FIG. 9, conventional servo signals SS" are formed on non-magnetized servo bands SB" by supplying record pulse currents PC to the non-magnetized servo bands SB". The record pulse current PC" is composed of zero currents and positive pulse currents, because it is aimed at avoiding the saturation of MR elements of a magnetic head. In this record pulse current PC", a magnetic tape MT is not magnetized when the zero currents are supplied. In addition, when the positive pulse currents are supplied, the magnetic tape MT is magnetized in one direction by means of leakage flux from servo gaps of the magnetic head. Finally, servo patterns SP" are formed so that servo signals SS" are written.

A magnetic tape recording/reproducing device has a servo signal reading element (MR element), and senses the variation in the magnetic flux generated from the servo signal SS", based on the variation in the electric resistance of the servo signal reading element. Furthermore, the magnetic tape recording/reproducing device outputs, as a reading signal, a differential (voltage) waveform in proportion to the variation in the magnetic flux. Therefore as the variation in the electric-resistor of the MR element is larger, the peak-to-peak value of the reading signal generated from the servo signal SS" increases. In other words, the SN ratio of the reading signal is improved. Further, when the magnetic flux from the servo signal SS" is large, or when the servo signal reading element (MR element) is wide, that is, has a large sensing area, the peak-to-peak value of the reading signal RSL from the servo signal SS increases, as shown in this figure.

In the future, it can be expected that the recording density of magnetic tapes will develop to several tens of terabytes. Accordingly, the number of the data tracks on a magnetic tape increases. In addition, each data track is narrowed, the interval between the adjacent data tracks is also narrowed, and the magnetic tape is thinned. Hence, the quantity of the magnetism which can be sensed from the servo signal decreases, and the variation in the magnetic flux from the servo signal SS" which can be sensed by the servo signal reading element also decreases. Therefore, the peak-to-peal value of the reading signal RSS" from the servo signal SS" decreases, as shown in FIG. 9D, thereby deteriorating the SN ratio of the reading signal RSS". This may be impossible for a magnetic tape recording/reproducing device to read the servo signal SS" precisely, thus deteriorating the positional control of the magnetic head. This can be a problem. Disadvantageously, the above-described servo writer with a turret, which has been proposed by the applicant, has not yet come to overcome the problem involved by such high density recording of magnetic tapes.

Taking the above disadvantage into account, the present invention has been conceived. An object of the present invention is to provide a servo writer in which servo write heads are easy to exchange, and which writes a servo signal from which the reading signal of an improved SN ratio can be obtained.

SUMMARY OF THE INVENTION

According to an aspect of the present invention, there is provided, a servo writer including:

(a1) a magnetic tape running system for running a magnetic tape, the magnetic tape running system comprising a supply reel for feeding a magnetic tape, and a take-up reel for rewinding the magnetic tape;

(a2) at least one DC erase head for DC-erasing servo bands of the running magnetic tape in a first direction along a long side of the magnetic tape;

(a3) a plurality of servo write heads being arranged downstream of the DC erase head in a running direction of the magnetic tape, the servo write heads for writing servo signals on the servo bands of the magnetic tape by magnetizing the servo bands in a second direction, the second direction being opposite to the first direction; and (a4) an installation section on which the servo write heads are arranged, the installation section comprising a switching means for switching the servo write heads to position one of the servo write heads at a location possible to write the servo signals to the magnetic tape.

In the above servo writer, the servo write heads arranged on the installation section are switched by the switching means, in such a way that desired one of the servo write heads is in contact with the magnetic tape. Further, the servo write heads are positioned downstream of the DC erase head in the running direction of the magnetic tape. Accordingly, the servo signals are written, by the servo write head, to the servo bands that have been DC-erased in the first direction. In this case, the servo signals are written to the servo bands in the second direction, that is, in the direction opposite to the first direction. With this servo writer, the variation in the magnetic flux is large at the interface between the portions magnetized in the first and second directions. As a result, the reading signal generated from the servo signal has an improved SN ratio.

Moreover, in the above servo writer, the installation section is a rotatable turret on which the servo write heads are arranged, and the switching means switches the servo write heads by rotating the turret.

With this turret, the servo write heads can be switched to come into contact with the magnetic tape, merely by rotating the turret by predetermined degrees.

According to another aspect of the present invention, there is provided, the above writer, in which the installation section is a first installation section and the switching means is a first switching mean, further including a second installation section having a second switching means. On the second installation section, the DC erase heads are arranged, and the second switching means switches the DC erase heads to position one of the DC erase heads at a location possible to DC-erase the servo bands of the magnetic tape. The second installation section includes a rotatable second turret, and the second switching means switches the DC erase heads by rotating the second turret.

With the above servo writer, the DC erase heads are switched in such a way that desired one of the DC erase heads comes into contact with the magnetic tape by rotating the second turret by predetermined degrees.

According to yet another aspect of the present invention, there is provided, the above servo writer in which the servo write heads are related to the individual DC erase heads, and the DC erase heads are arranged on the first turret, so that when one of the servo write heads is positioned at a location possible to write servo signals to the magnetic tape, and corresponding one of the DC erase heads is positioned upstream of this servo write head in the running direction of the magnetic tape and at a location possible to DC-erase the servo bands of the magnetic tape.

With the above structure, the DC erase heads are switched by rotating the first turret by predetermined degrees, so that desired one of the DC erase heads is used to DC-erase the servo bands of the magnetic tape.

In addition, each of the servo write heads and corresponding one of the DC erase heads are integrated.

With the above structure, the positional accuracy of the servo write head and the DC erase head is ensured.

According to still another aspect of the present invention, there is provided, the above servo writer in which the servo write heads on the installation section are arranged parallel to one another at a standby spot close to a running route of the magnetic tape, and the switching means moves one of the servo write heads to the running route of the magnetic tape, and positions the other or others of the servo write heads at the standby spot, thereby switching the servo write heads.

In the above structure, desired one of the servo write heads moves forward to the magnetic tape and, then come into contact with it, while the other or others of the servo write heads move backward and away from the magnetic tape. In this way, the servo write heads can be exchanged.

According to yet another aspect of the present invention, there is provided, the above servo writer in which the servo write heads are related to the individual the DC erase heads. Therefore, when one of the servo write heads is positioned at a location possible to write the servo signals to the magnetic tape, corresponding one of the DC erase heads is positioned upstream of this servo write head in a running direction of the magnetic tape and at a location possible to DC-erase the servo bands of the magnetic tape.

In the above structure, desired one of the DC erase heads moves forward to the magnetic tape and, then come into contact with it, while the other of others of the DC erase heads move backward and away from the magnetic tape. In this way, the DC erase heads can be exchanged.

In conclude, with the above-described servo writer, it is possible to switch its servo write heads easily, and to write a servo signal from which a reading signal of an improved SN ratio can be obtained. Consequently, the productivity of magnetic tapes increases.

Other aspects, features and advantages of the present invention will become apparent upon reading the following specification and claims when taken in conjunction with the accompanying drawings.

BRIEF DESCRIPTION OF THE DRAWINGS

For more complete understanding of the present invention and the advantages hereof, reference is now made to the following description taken in conjunction with the accompanying drawings wherein:

FIG. 9 is a view for explaining a magnetic tape magnetized by a conventional servo writer.

DETAILED DESCRIPTION OF THE EXEMPLARY EMBODIMENTS OF THE INVENTION

First Embodiment

A detail description will be given below, of a servo writer according to a first embodiment of the present invention, with reference to attached drawings.

Figure 1:
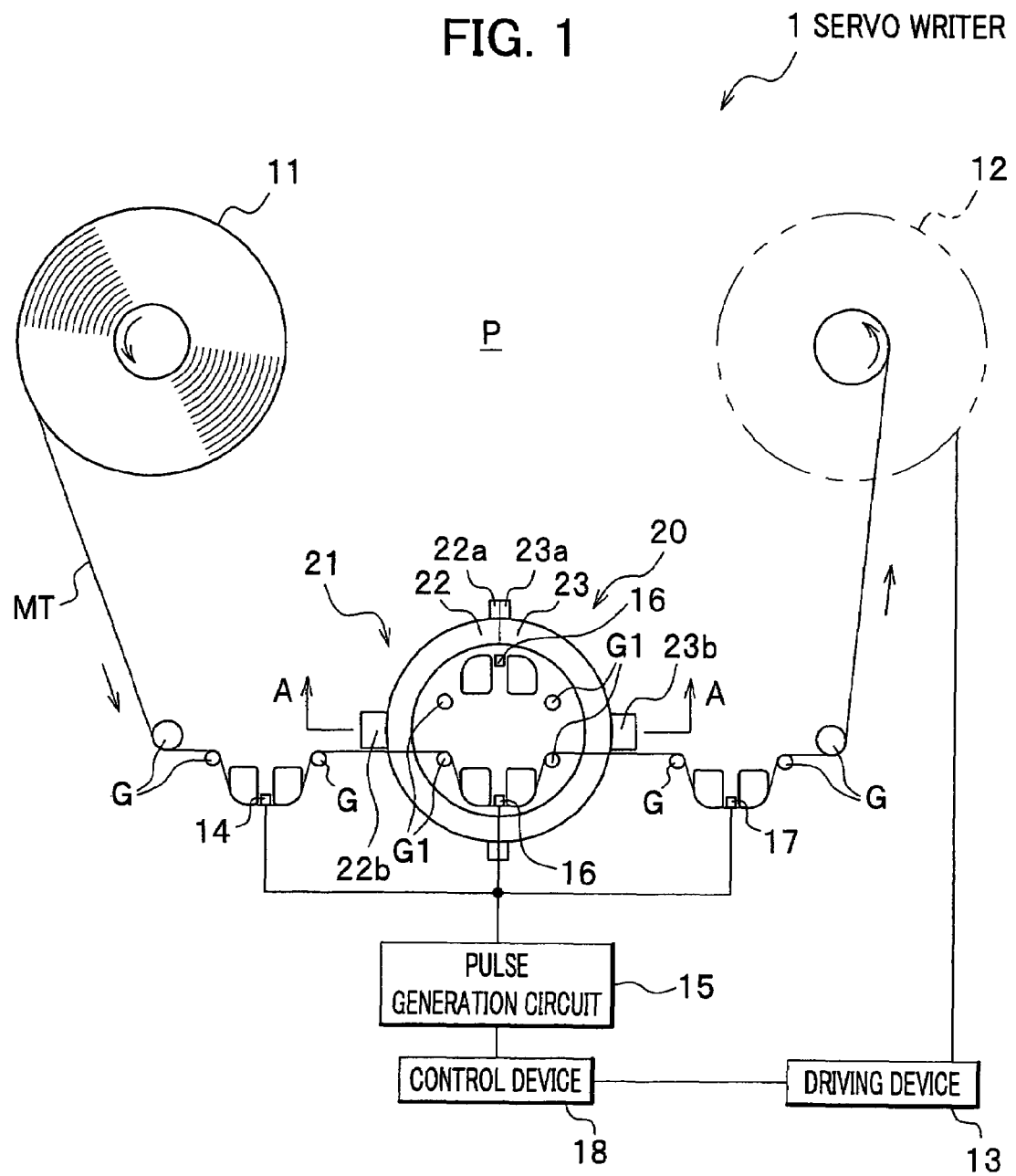
FIG. 1 is a view depicting a structure of a servo writer according to a first embodiment of the present invention.

Referring to FIG. 1, a servo writer 1 includes, as main components, a supply reel 11, a take-up reel 12, a driving device 13, a DC erase head 14, a pulse generation circuit 15, multiple (two in this embodiment) servo write heads 16 and 16, a turret 20 (first turret), an AC erase head 17 and a control device 18. Moreover, the servo writer 1 further includes a power supply, a cleaning device for cleaning a magnetic tape MT, and a verify device for inspecting written servo signals SS (see FIG. 3) that are all not shown in the figures.

At the supply reel 11, the magnetic tape MT is set around a large-diameter pancake, prior to writing of servo signals SS. This magnetic tape MT has been formed by cutting a web source into a product width. When the servo signals SS are written thereto, the magnetic tape MT is fed by the supply reel 11. The magnetic tape MT fed from the supply reel 11 is transferred to the DC erase head 14, servo write head 16, and AC erase head 17, while being guided by guides G, etc. The servo signals SS are written to the magnetic tape MT by the servo write head 16, and the magnetic tape MT is then transferred to the take-up reel 12, while being guided by the guides G, etc. The take-up reel 12 is rotatably driven by the driving device 13, and rewinds the magnetic tape MT to which the servo signals SS (see FIG. 3) have been written.

The driving device 13 rotatably drives the take-up reel 12. Furthermore, the driving device 13 includes a motor, a motor driving circuit for supplying a motor current to the motor, and a gear for coupling a motor shaft and the take-up reel 12. The driving device 13 generates the motor current in the motor driving circuit, in response to a motor current signal from the control device 18. Further, the driving device 13 supplies the motor current to the motor, and transfers the rotation power of the motor to the take-up reel 12 through the gear, etc., so that the take-up reel 12 is rotatably driven.

Herein, the supply reel 11, take-up reel 12, the driving device 13 for driving the take-up reel 12, and the guides G refer to "magnetic tape running system", collectively.

The DC erase head 14 is a degaussing head that magnetizes (DC-magnetizes) the whole width of the magnetic tape MT in the forward direction, that is, in the running direction of the magnetic tape MT. The DC erase head 14 is positioned upstream of the turret 20 (described later) in the running direction. Accordingly, the magnetic tape MT is magnetized in the forward direction before the servo signal SS is written thereto. Note that in this embodiment, the whole width of the magnetic tape MT is magnetized in the forward direction, but alternatively, only the portions where the servo bands SB are to be formed may be magnetized. In this case, the AC erase head 17 (described later) can be omitted. The pulse generation circuit 15 applies a degaussing signal to the DC erase head 14 continuously.

Figure 3:
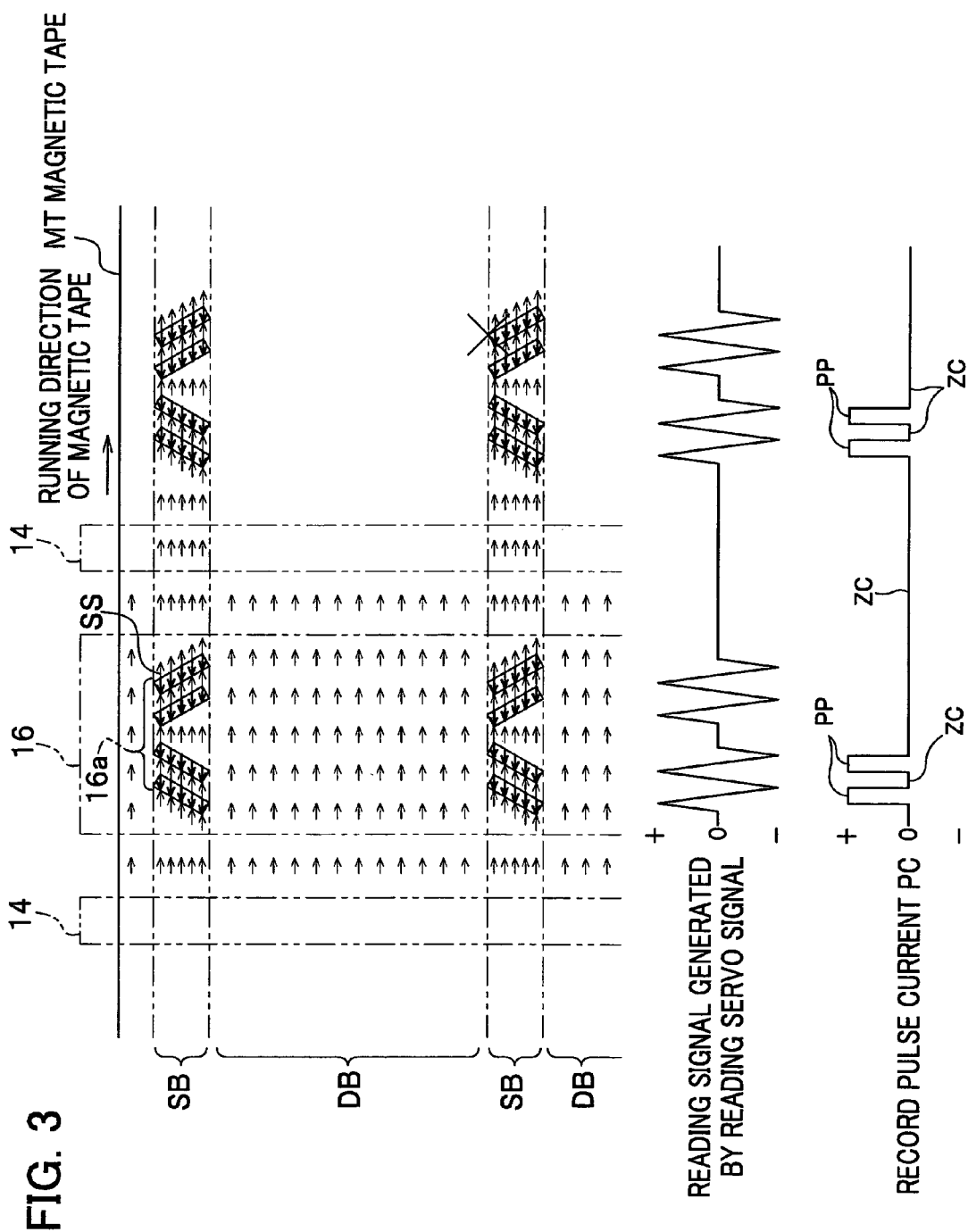
FIG. 3 is a view for explaining a magnetic tape magnetized by the servo writer the first embodiment.

The pulse generation circuit 15 includes various electric components, and supplies a record pulse current PC to the servo write head 16 (see FIG. 3). The pulse generation circuit 15 generates a positive pulse current PP, a zero current ZC, a positive pulse current PP, and a zero current ZC continuously in this order, based on a pulse control signal from the control device 18. Subsequently, the pulse generation circuit 15 does not supply a current during a predetermined period (zero current ZC). The above pattern is repeated, thereby generating a record pulse current PC (see FIG. 3). The pulse generation circuit 15 supplies this record pulse current PC to a coil (not shown) of the servo write head 16. The positive pulse current PP is large enough to magnetize the magnetic layer of the magnetic tape MT by means of leak flux from a head gap 16a. The value is the positive pulse current PP is set, based on the property of the coil of the servo write head 16. The pulse width (duration) of the positive pulse current PP defines the width of a servo pattern SP along the long side of the magnetic tape MT, and it is set, based on the running speed of the magnetic tape MT, the shape of the head gap 16a of the servo write head 16, and the like. The duration of the zero current ZC defines the interval between the servo patterns SP, and it is set, based on the running speed of the magnetic tape MT and the like.

The servo write head 16 is a magnetic head for writing the servo signal SS, and it is provided with a coil (not shown) for generating magnetic flux, and has head gaps 16a. In this embodiment, the number of the head gaps 16a is two, and they are related to the servo bands SB and SB of the magnetic tape MT. The head gaps 16a are formed by means of a lithography technique that is typically utilized in a semiconductor field. Furthermore, the head gap 16a has a trapezoid shape forming a predetermined angle with the long side of the tape MT. On the turret 20, two servo write heads 16 and 16 are provided. These servo write heads 16 and 16 may be identical to each other. Alternatively, they may be different, and the individual heads correspond to the different types (thickness or width) of the magnetic tape MT. If the heads are identical, even when one is damaged, the other can replace the damaged one. If the heads are different, they are exchanged in accordance with the type of the magnetic tape MT or the shape of the servo pattern.

On the turret 20, the two servo write heads 16 and 16 are arranged symmetrically with respect to the center of the turret 20, and they face toward the outer edge of the turret 20. On the both sides of each servo write head 16, the guides G1 are arranged, and they guide the magnetic tape MT to the servo write head 16.

Figure 2:
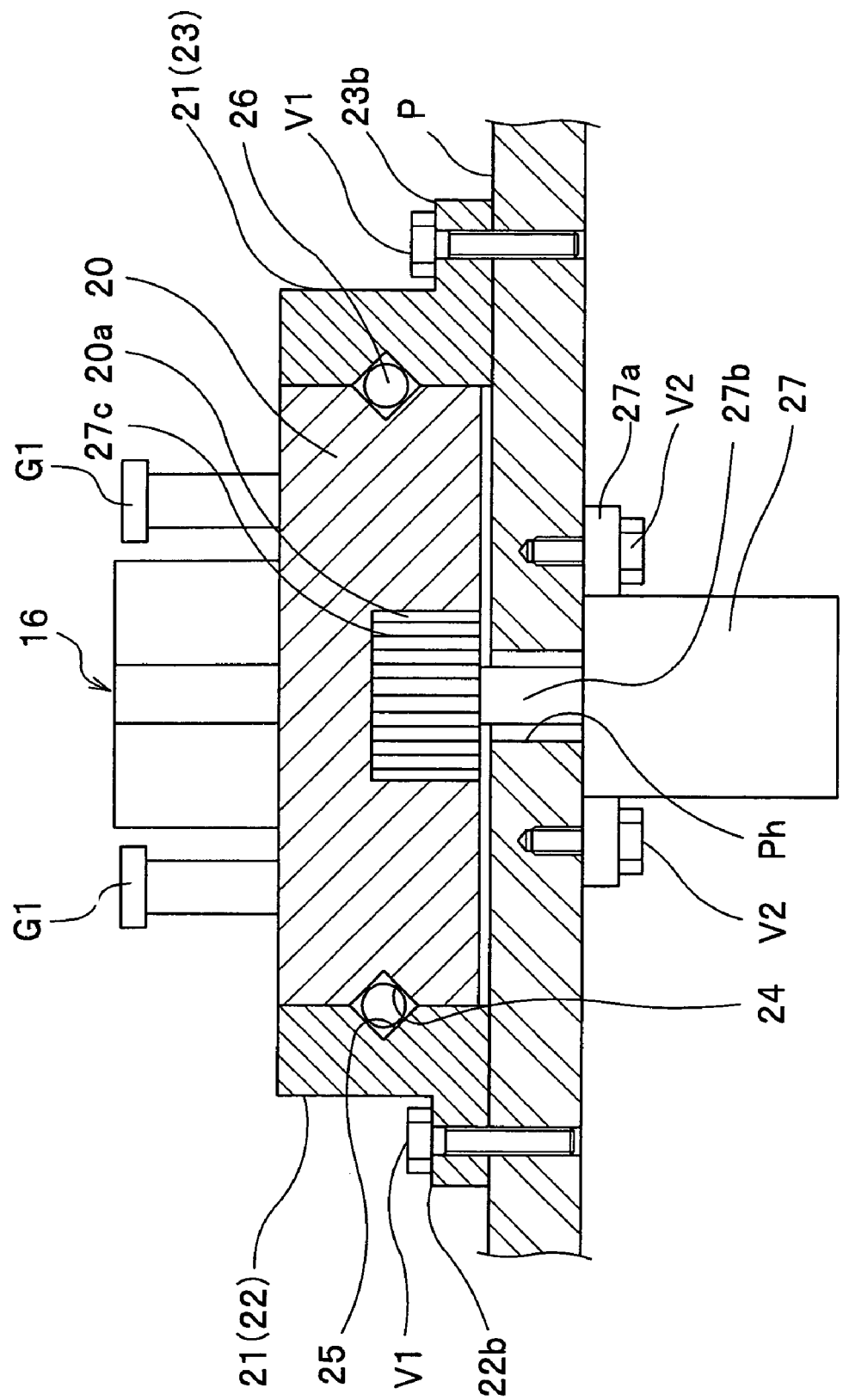
FIG. 2 is a cross-sectional view of a turret taken along a line A—A of FIG. 1.

The turret 20 is sustained by the support frame 21, as shown in FIG. 1. The support frame 21 has substantially the same inner diameter as the outer diameter of the turret 20, and it is composed of a left frame 22 and a right frame 23 that are identically-shaped. The left frame 22 has flanges 22a and 22a at the both edges, and the right frame 23 has flanges 23a and 23a at the both edges. The flanges 22a and 23a are joined together by a screw (not shown) The left frame 22 has a protrusion 22b between the flanges 22a and 22a, and right frame 23 have a protrusion 23b between the flanges 23a and 23a. Referring to FIG. 2, screws V1 pass through holes formed in the protrusions 22b and 23b, respectively, whereby the support frame 21 is secured to a panel P of the servo writer 1 (see FIG. 1).

A V-shaped groove 24 is formed in the whole outer circumference of the turret 20. In addition, another V-shaped groove 25 is formed in the inner circumferences of the left frame 22 and right frame 23 of the support frame 21, facing the V-shaped groove 24 of the turret 20. The V-shaped grooves 24 and 25 form a square cross-section space. A ball bearing 26 is fitted into this space, and the turret 20 therefore rotates smoothly so as not to catch on the support frame 21. In this embodiment, the left frame 22 and right frame 23 of the support frame 21 has more than three V-shaped grooves 25, so that the ball bearings 26 press the turret 20 in at least three directions. This pressing fashion allows the servo write heads 16 to be positioned stably, thereby writing the servo signal on the constant location of the magnetic tape MT. In addition, to make the rotation of the turret 20 smoother, it is preferable that the support frame 21 and turret 20 are formed of a hard metal such as stainless, and their surfaces are polished.

In order to install a stepping motor 27, which rotates the turret 20, on the back surface of the panel P where the turret 20 is mounted, flanges 27a of the stepping motor 27 are fixed to the panel P with screws V2. Moreover, a rotation shaft 27b of the stepping motor 27 passes through a hole Ph formed in the panel P. A serration shaft 27c formed at the end of the rotation shaft 27b fits into a serration hole 20a formed in the central bottom of the turret 20. In this way, the turret 20 rotates in steps by the stepping motor 27.

The stepping motor 27 is designed to rotate in steps of 180 degrees (clockwise or counterclockwise). Accordingly, since the turret 20 rotates in steps of ±180 degrees and then stopped, one of the servo write heads 16 can be located at a desired position. Then, the servo write head 16 at the desired position writes servo signals on the magnetic tape MT being transferred. Therefore, the servo write heads 16 and 16 can be exchanged easily, merely by rotating the turret 20 in steps of 180 degrees and by stopping it. In other words, it is possible to write a servo signal with any one of the servo write heads 16 without devoting a long time to exchange the servo write heads 16. This leads to the cost reduction.

Note that in this embodiment, the number of the servo write heads 16 on the turret 20 is two, but may be three or four. In this case, the stepping motor 27 needs to rotate in steps of 120 or 90 degrees, whereby any of the servo write heads 16 can be located on a desired position and write servo signals there.

In the AC erase head 17, degaussing magnetic gaps (not shown) are provided on the positions corresponding to data bands DB of the magnetic tape MT shown in FIG. 3. Naturally, any portions other than the data band DB, that is, other than the portions on which data is to be recorded may also be erased, as long as the servo bands SB are not erased. The pulse generation circuit 15 supplies a degaussing signal to the AC erase head 17 continuously.

The control device 18 controls the individual units of the servo writer 1, and includes a CPU (central processing unit), various memories and the like. The control device 18 generates a motor current signal for controlling the motor current of the driving device 13 and, then transmits it to the driving device 13. As a result, the running speed of the magnetic tape MT is made constant, every time the servo signals SS are written thereto. Furthermore, the control device 18 generates a pulse control signal for regulating the current, the pulse width and the timing of positive pulse current PP of the record pulse current PC and, then transmits it to the pulse generation circuit 15. Consequently, the servo signal SS for setting the width of the servo pattern SP along the long side of the magnetic tape MT and the interval of the servo patterns SP are defined. In this case, the control device 18 generates a pulse pattern composed of a positive pulse current PP, a zero current ZC, a positive pulse current PP and a zero current ZC generated in this order.

Next, a description will be given below, of a process in which the above servo writer 1 writes the servo signals SS. First, the turret 20 rotates to prepare any one of the servo write heads 16. Subsequently, pancake-shaped, slit magnetic tape MT is set around the supply reel 11 of the servo writer 1, and the end of the magnetic tape MT is coupled to the core of the take-up reel 12. The magnetic tape MT is rewound by the take-up reel 12 driven by the driving device 13, while being guided by the guides G. etc.

The whole width of the running magnetic tape MT is magnetized in the forward direction by the DC erase head 14, and the servo bands are then magnetized in the reverse direction by the servo write head 16, as shown in FIG. 3. As a result, the servo signals SS are written to the magnetic tape MT. Herein, the forward and reverse directions are defined with respect to the running direction of the magnetic tape, and are also called "first and second directions", respectively.

As for the record pulse current PC, the positive pulse current PP, zero current ZC, positive pulse current PP, and zero current ZC, each of which has a predetermined period, are fed in this order. The servo write head 16 magnetizes the magnetic layer of the magnetic tape MT in the reverse direction by means of the leakage flux from the head gaps 16a, when the positive pulse current PP from the pulse generation circuit 15 is fed to the coil of the servo write head 16. On the other hand, the magnetic layer of the magnetic tape MT is not magnetized, when the zero current ZC is fed thereto. Accordingly, the servo patterns SP magnetized in the reverse direction are formed on each servo band SB magnetized in the forward direction of the magnetic tape MT. In this case, portions other than the servo patterns SP stay magnetized in the forward direction. Finally, portions where the data bands DB are to be formed are demagnetized by the AC erase head 17.

In the magnetic tape MT described above, the magnetized direction of the servo band SB differs from that of servo pattern SP by 180 degrees. Accordingly, the magnitude of the magnetic flux on the interface between the servo pattern SP and the servo band SB changes dramatically. This dramatic change allows a high output signal to be obtained from the servo signal SS.

As described above, with the servo writer 1 of the first embodiment, it is possible to switch the servo write heads 16 easily, and to write, to the magnetic tape MT, the servo signal SS from which an output signal of an excellent SN ratio can be obtained.

Up to this point, the servo writer of the first embodiment has been described. However, the present invention is not limited thereto, and various other embodiments can be conceived. For example, in this embodiment, a recording current is a pulse current composed of a positive current and a zero current which repeat alternately. However, alternatively, the recording current is a pulse current composed of a negative current and a zero current which repeat alternately. Moreover, in this embodiment, the servo band is formed by magnetizing the magnetic tape MT in the forward direction, and the servo signal is formed by magnetizing it in the reverse direction. However, alternately, the servo band may be magnetized in the reverse direction, and the servo signal may be magnetized in the forward direction.

Second Embodiment

A description will be given below, of a servo writer according to a second embodiment of the present invention, with reference to attached drawings. In this embodiment, the same reference numerals are given to the same parts as those of the first embodiment, and duplicate description is therefore omitted.

Figure 4:
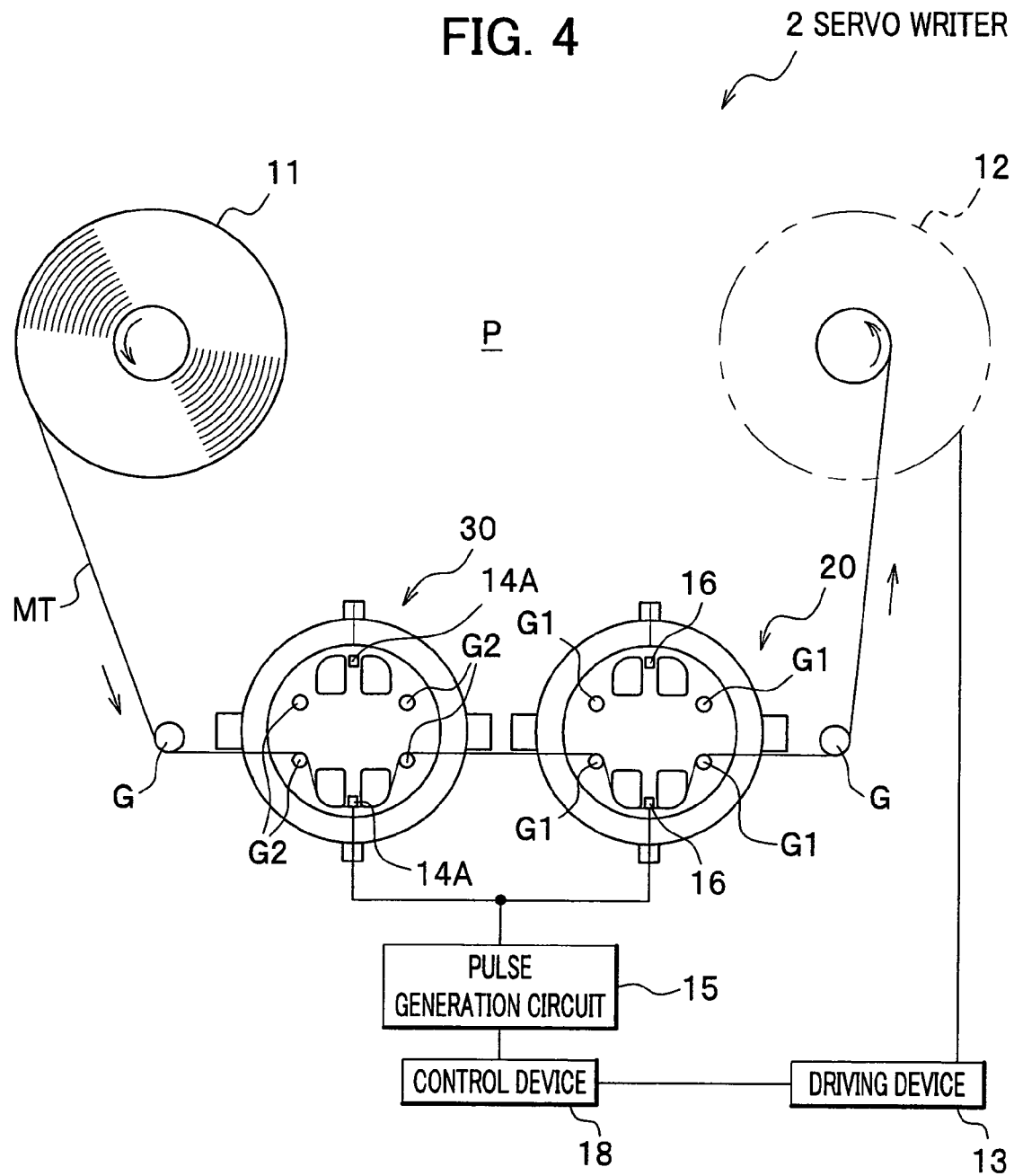
FIG. 4 is a view depicting a structure of a servo writer according to a second embodiment of the present invention.

Referring to FIG. 4, a servo writer of the second embodiment differs from that of the first embodiment in that the AC erase head 17 is removed, and multiple (two in this embodiment) DC erase heads 14A and 14A are provided on a second turret 30 that is similar to the turret 20. The servo writer 2 of this embodiment includes mainly the supply reel 11, the take-up reel 12, the two DC erase heads 14A and 14A, the two servo write heads 16 and 16, the turret 20, and the turret 30 (the second turret), the driving device 13, the pulse generation circuit 15, and the control device 18.

Each DC erase head 14A is a degaussing head that magnetizes the servo bands SB (see FIG. 3) in the forward direction (DC magnetization). By magnetizing the servo bands SB alone, the degaussing process of the DC-magnetized data bands DB can be omitted, and the AC erase head 17 can be made unnecessary. In this embodiment, the DC erase heads 14A and 14A may be identical to each other. Alternatively, they may be different and correspond to the different servo write heads 16 and 16 on the downstream side. In the former case, when one of the DC erase heads fails, the other can be used instead. In the latter case, the DC erase heads 14A and 14A can easily be exchanged in relation to the exchange of the servo write heads 16 and 16.

On the turret 30 positioned upstream of the turret 20, the two DC erase heads 14A and 14A are arranged symmetrically opposite each other, and they face toward the outer edge. On the both sides of each DC erase head 14A, guides G2 are arranged, and they guide the magnetic tape MT to the DC erase head 14A. The turret 30 has the same structure as that of the turret 20, and merely by rotating the turret 30, the DC erase heads 14A and 14A can be exchanged.

Next, a description will be given below, of a process in which the above servo writer 2 writes the servo signals SS. First, by rotating both the turrets 20 and 30, any one of the DC erase heads 14A and 14A and any one of servo write heads 16 and 16 are prepared. Then, the pancake-shaped, slit magnetic tape MT is set around the supply reel 11, and the end of the magnetic tape MT is coupled to a core of the take-up reel 12. The magnetic tape MT runs, while being guided by the guides G, etc., and is then rewound around the take-up reel 12 driven by the driving device 13.

The DC erase head 14A magnetizes the servo bands SB (see FIG. 3) alone in the forward direction. Subsequently, the servo write head 16 writes the servo signals SS (see FIG. 3) to the servo bands SB by magnetizing the servo bands SB in the reverse direction.

With the servo writer 2 of the second embodiment, the following effect can be produced.
(1) Not only the servo write heads 16 and 16, but also the DC erase heads 14A and 14A are easy to exchange.
(2) Since the degaussing process carried out by the AC erase head 17 is made unnecessary, the overall manufacturing cost is reduced.
(3) The output signal generated by reading the servo signal SS written by the servo writer 2 is large in level, thereby producing the magnetic tape MT exhibiting the excellent SN ratio.

Third Embodiment

Figure 5:
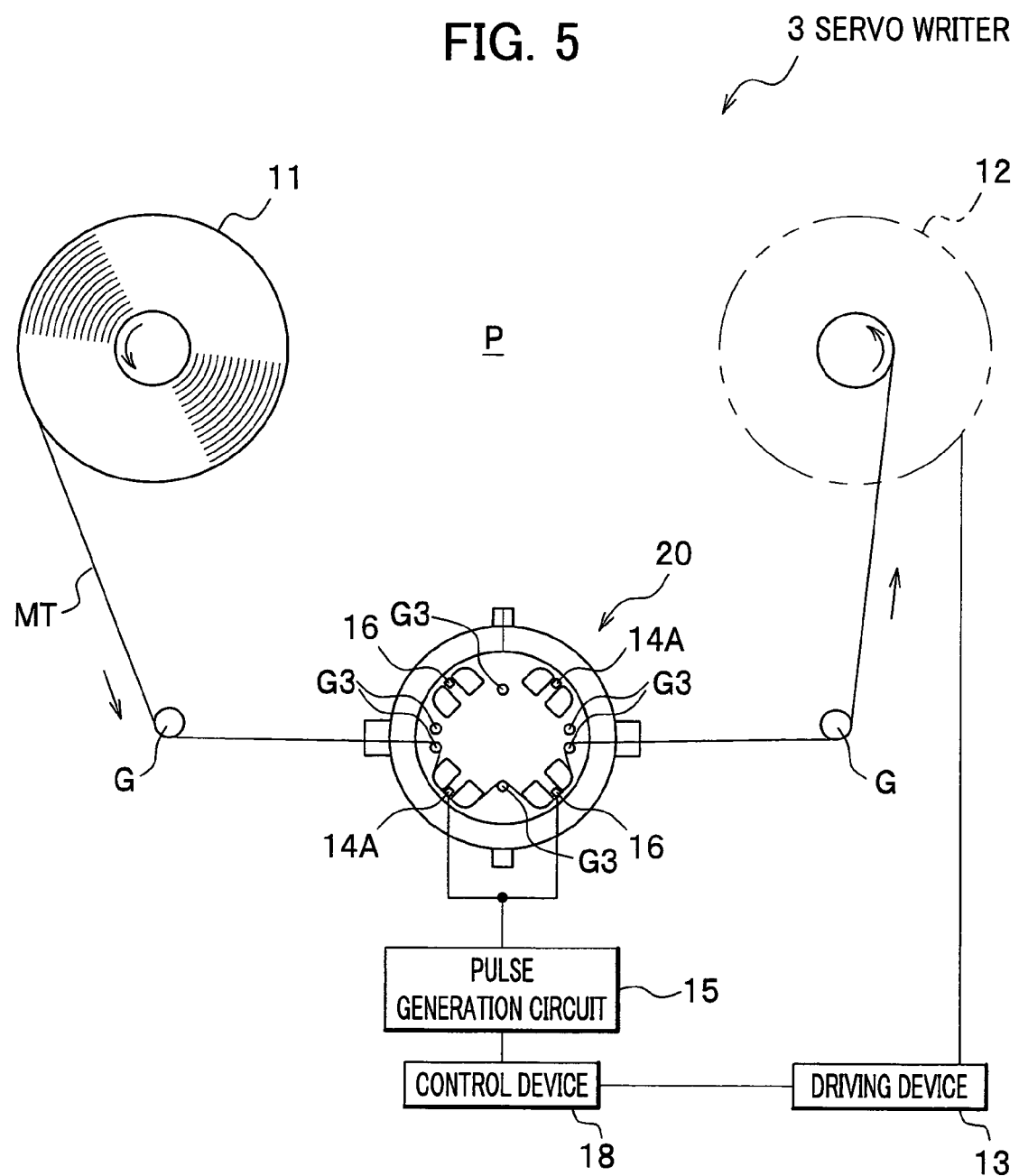
FIG. 5 is a view depicting a structure of a servo writer according to a third embodiment of the present invention.

Referring to FIG. 5, a description will be given below, of a servo writer according to a third embodiment of the present invention, with reference to attached drawings. In this embodiment, the same reference numerals are given to the same parts as those of the above-described embodiments, and duplicate description is therefore omitted.

A servo writer of the third embodiment differs from that of the first embodiment in that the AC erase head 17 is removed, and the multiple (two in this embodiment) DC erase heads 14A and 14A are arranged on the turret 20. The servo writer 3 of this embodiment includes mainly the supply reel 11, the take-up reel 12, the two DC erase head 14A and 14A, the two servo write heads 16 and 16, the turret 20, the driving device 13, the pulse generation circuit 15, and the control device 18.

On the turret 20, each of the DC erase heads 14A and 14A and corresponding one of the servo write heads 16 and 16 make a pair. The two pairs are arranged symmetrically opposed each other. In addition, between the individual adjacent heads, guides G3 for guiding magnetic tape MT to the heads are arranged. When the magnetic tape MT is brought into contact with the individual heads, the DC erase head 14A is located upstream and the servo write head 16 is located downstream in the running direction of the magnetic tape MT. Due to this arrangement, by rotating the turret 20, the DC erase heads 14A and 14A and the servo write heads 16 and 16 can be exchanged, respectively, as a single unit.

Next, a description will be given below, of a process in which the above servo writer 3 writes the servo signals SS. First, by rotating the turret 20, any one of the DC erase heads 14A and any one of servo write heads 16 and 16 are prepared. Then, the pancake-shaped, slit magnetic tape MT is set around the supply reel 11, and the end of the magnetic tape MT is coupled to a core of the take-up reel 12. The magnetic tape MT runs, while being guided by the guides G, etc., and is then rewound around the take-up reel 12 driven by the driving device 13.

The DC erase head 14A magnetizes the servo bands SB (see FIG. 3) of the running magnetic tape MT in the forward direction. Subsequently, the servo write head 16 writes the servo signals SS (see FIG. 3) to the servo bands SB of the magnetic tape MT by magnetizing the servo bands SB alone in the reverse direction.

With the servo writer 3 of the third embodiment, the following effect can be produced.
(1) The DC erase heads 14A and 14A and the servo write heads 16 and 16 are easy to exchange.
(2) each of the DC erase heads 14A and 14A and corresponding one of the servo write heads 16 and 16 make up a single unit. The heads can be exchanged for each unit. Therefore, the accuracy of relative position of both the heads is improved.
(3) The output signal generated by reading the servo signal SS written by the servo writer 3 is large in level, thereby producing the magnetic tape MT exhibiting the excellent SN ratio.

Up to this point, the servo writer of the third embodiment has been described. However, the present invention is not limited thereto, and the following modification can be conceived.

Figure 6:
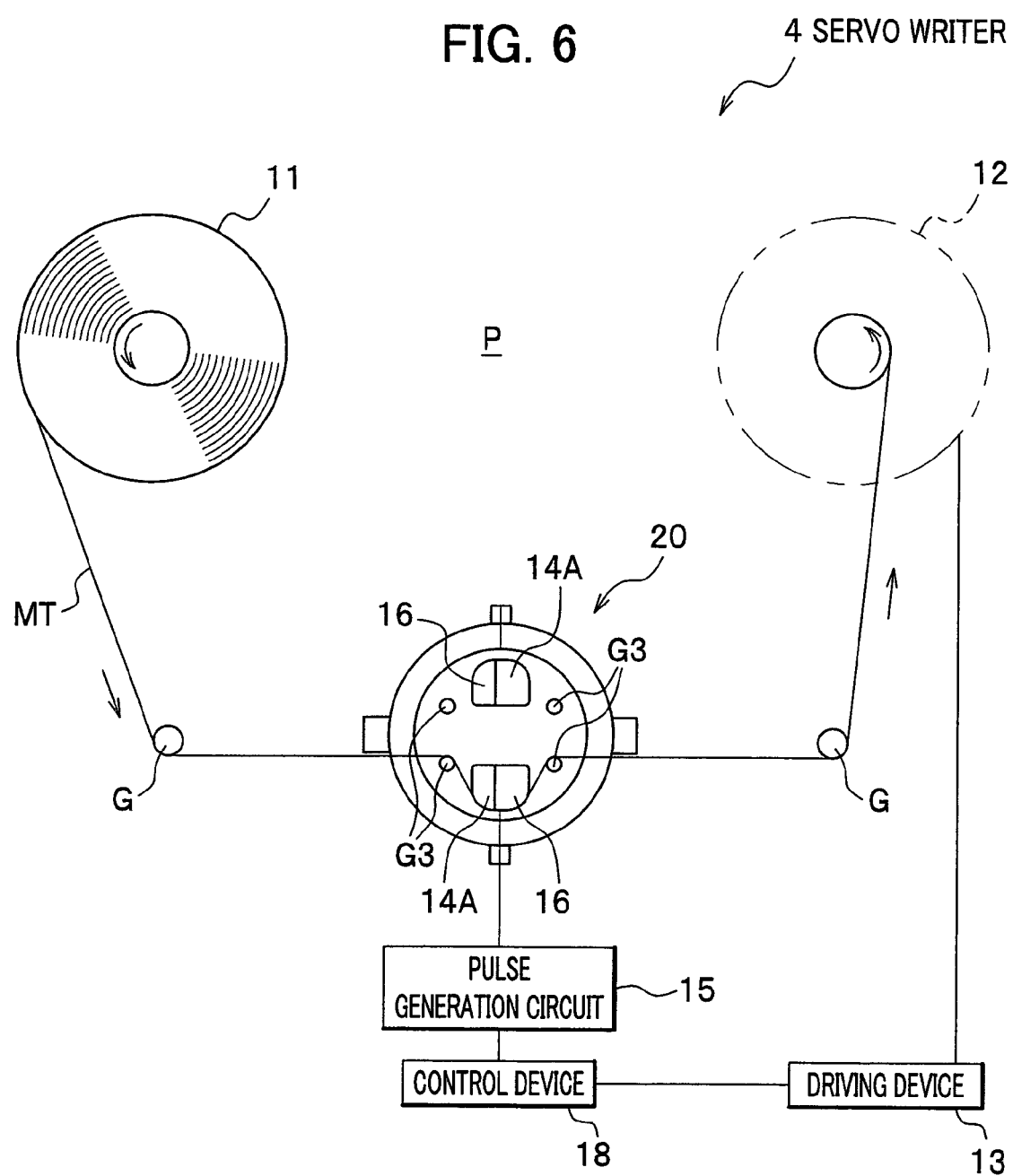
FIG. 6 is a view depicting a structure of a servo writer according to a modification example of the third embodiment.

Furthermore, as described in FIG. 6, each of the DC erase heads 14A and 14A and corresponding one of the servo write heads 16 and 16 may be integrated, respectively, thus constituting a servo writer 4. Owing to this structure, the position of the heads along the width of the magnetic tape MT can be ensured more precisely.

Fourth Embodiment

Next, a description will be given below, of a servo writer according to a fourth embodiment of the present invention, with reference to attached drawings. In this embodiment, the same reference numerals are given to the same parts as those of the above-described embodiments, and duplicate description is therefore omitted.

Figure 7:
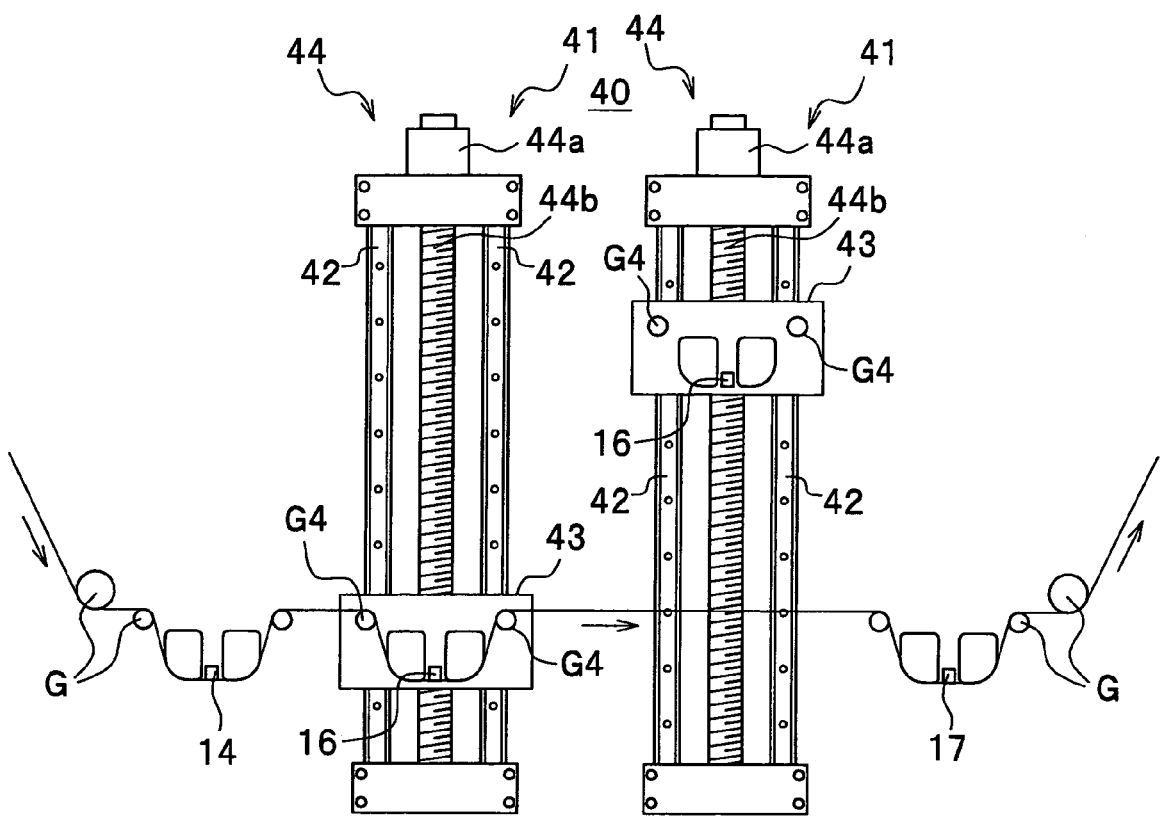
FIG. 7 is a view depicting a structure of a servo writer according to a fourth embodiment of the present invention.

Referring to FIG. 7, a servo writer of the fourth embodiment differs from that of the first embodiment in that an installation section 40 including two vertical moving devices 41 and 41 is provided, instead of the turret 20. In this installation section 40, the DC erase head 14 is located upstream, and the AC erase head 17 is located downstream in the running direction of the magnetic tape MT.

As shown in FIG. 7, the two vertical moving devices 41 and 41 in the installation section 40 are arranged parallel to each other and perpendicular to the running direction of the magnetic tape MT. Each vertical moving device 41 may be a known device, and includes linear guides 42 and 42, a slider 43 placed across the linear guides 42 and 42, and a driving mechanism 44 (switching means) for sliding the slider 43 on the linear guides 42 and 42.

The servo write head 16 is placed on the slider 43, and guides G4 for guiding the magnetic tape MT to the servo write head 16 are arranged on the both sides of the servo write head 16.

Each driving mechanism 44 includes a stepping motor 44a, a ball screw shaft 44b coupled to the stepping motor 44a directly, and a ball screw nut (not shown) moved by the ball screw shaft 44b along the shaft. The ball screw nut is secured to the back surface of the slider 43 through a bracket, and slides along the shaft in conjunction with the slider 43 when the stepping motor 44a rotates the ball screw shaft 44b.

In the installation section 40, the driving mechanisms 44 and 44 slide the respective sliders 43 and 43, thereby enabling the servo write heads 16 and 16 to be exchanged. Specifically, as shown in FIG. 7, when the upstream servo write head 16 writes servo signals to the magnetic tape MT, the slider 43 shown in the left side of this figure moves forward to come into contact with the magnetic tape MT. Simultaneously, the slider 43 shown in the right side of the figure moves backward and away from the magnetic tape MT, and stops at a predetermined location (called "standby spot", herein). As a result, the servo write heads 16 are easy to exchange.

Up to this point, the servo writer of the fourth embodiment has been described. However, the present invention is not limited thereto, and the following modification can be conceived. In this embodiment, the DC erase head 14 is provided upstream of the installation section 40. However, alternatively, a DC erase head installation section where multiple DC erase heads are arranged may be provided upstream of the installation section 40. In this case, the DC erase heads 14 and the servo write heads 16 can be exchanged, respectively, at the same time.

Fifth Embodiment

Next, a description will be given below, of a servo writer according to a fifth embodiment of the present invention, with reference to attached drawings. In this embodiment, the same reference numerals are given to the same parts as those of the above-described embodiments, and duplicate description is therefore omitted.

Figure 8:
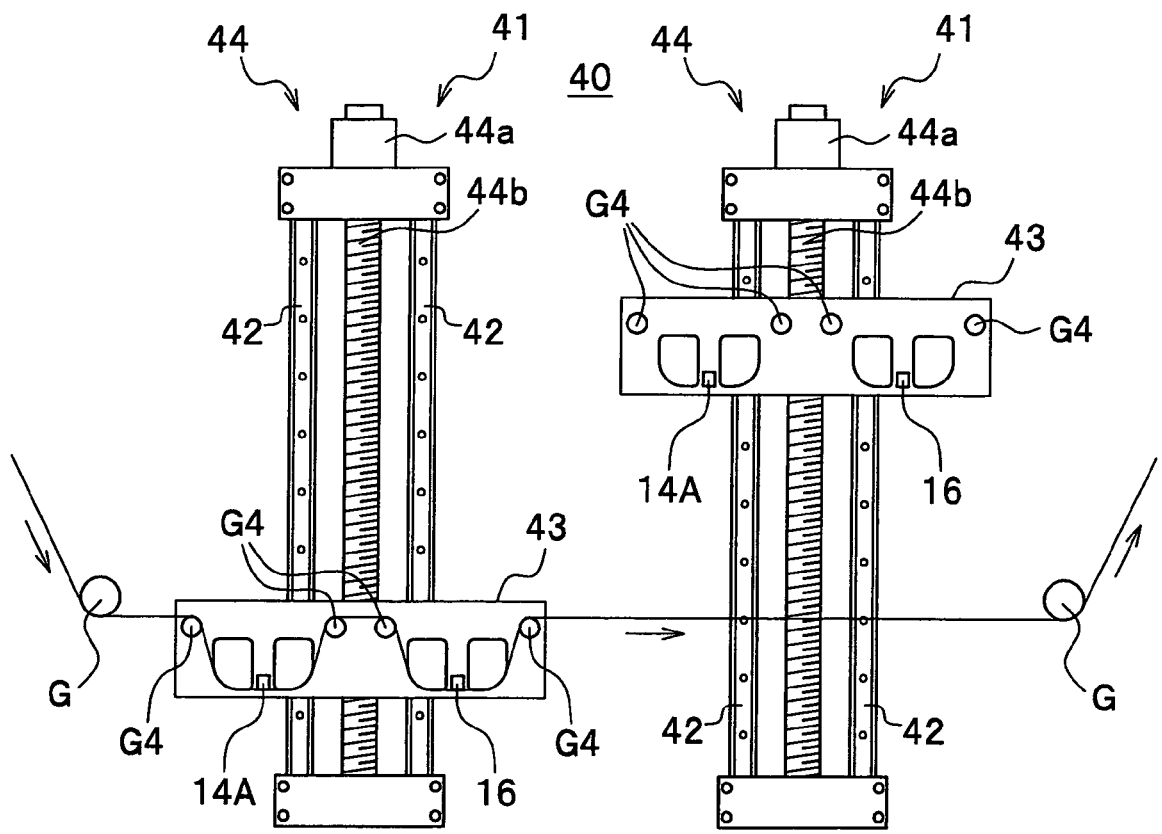
FIG. 8 is a view depicting a structure of a servo writer according to a fifth embodiment of the present invention.

Referring to FIG. 8, a servo writer of the fifth embodiment differs from that of the fourth embodiment in that the AC erase head 17 is removed, and two DC erase heads 14A and 14A are placed on the slider 43 and 43, respectively, instead of the DC erase head 14. In other words, as shown in FIG. 8, the DC erase head 14A is placed corresponding to and upstream of the servo write head 16 on the slider 43.

With this structure, the driving mechanism 44 slides the slider 43, whereby the DC erase heads 14A and 14A and the servo write heads 16 and 16 are easy to exchange, respectively. Specifically, as shown in FIG. 8, when the upstream servo write head 16 writes servo signals to the magnetic tape MT, the slider 43 shown in the left side of this figure moves forward to come into contact with the magnetic tape MT. Simultaneously, the slider 43 shown in the right side of the figure moves backward and away from the magnetic tape MT, and stops at the standby spot. Consequently, it is possible to exchange easily the DC erase heads 14A and 14A and the servo write heads 16 and 16, respectively. This exchange is performed by handling the DC erase head 14A and the servo write head 16 as a single unit, so that the relative position of the both heads is made accuracy. In addition, the DC erase head 14A and the servo write head 16 on the slider 43 may be integrated. In this case, the accuracy of the relative position along the width of the magnetic tape MT can be ensured.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A servo writer comprising:
a magnetic tape running system for running a magnetic tape, the magnetic tape running system comprising a supply reel for feeding the magnetic tape, and a take-up reel for rewinding the magnetic tape;
at least one DC erase head for DC-erasing servo bands of the running magnetic tape in a first direction along a long side of the magnetic tape;
a plurality of servo write heads being positioned downstream of the DC erase head in a running direction of the magnetic tape, the servo write heads for writing servo signals to the servo bands of the magnetic tape by magnetizing the servo bands in a second direction, the second direction being opposite to the first direction;
an installation section on which the servo write heads are arranged, the installation section comprising a switching means for switching the servo write heads to position one of the servo write heads at a location possible to write the servo signals to the magnetic tape; and
a control device for controlling switching of the servo write heads by the switching means, depending on types of the servo write heads, the control device being connected to the switching means.

2. The servo writer according to claim 1, wherein the installation section comprises a rotatable turret on which the servo write heads are arranged, and wherein the switching means switches the servo write heads by rotating the turret.

3. The servo writer according to claim 1, wherein the installation section is a first installation section, and the switching means is a first switching means.

4. The servo writer according to claim 3 further comprising
a second installation section;
wherein the at least one DC erase head includes at least two DC erase heads, and
the at least two DC erase heads are arranged on, the second installation section comprising a second switching means for switching the at least two DC erase heads to position one of the at least two DC erase heads at a location possible to DC-erase the servo bands of the magnetic tape.

5. The servo writer according to claim 4, wherein the second installation section comprises a rotatable second turret on which the at least two DC erase heads are arranged, and the second switching means switches the at least two DC erase heads by rotating the second turret.

6. The servo writer according to claim 5, wherein the first installation section comprises a rotatable first turret on which the servo write heads are arranged, and the first switching means switches the servo write heads by rotating the first turret.

7. The servo writer according to claim 4, wherein the at least two DC erase heads on the second installation section are arranged parallel to one another at a standby spot close to the running route of the magnetic tape,
wherein the switching means moves one of the at least two DC erase heads to the running route of the magnetic tape, and puts the other or others of the at least two DC erase heads at the standby spot, thereby switching the at least two DC erase heads.

8. The servo writer according to claim 7, wherein the servo write heads on the first installation section are arranged parallel to one another at the standby spot close to the running route of the magnetic tape, and
wherein the first switching means moves one of the servo write heads to the running route of the magnetic tape, and puts the other or others of the servo write heads at the standby spot, thereby switching the servo write heads.

9. The servo writer according to claim 4, further comprising a control device for controlling, depending on types of the servo write heads, switching of the servo write heads by the first switching means and of the at least two DC erase heads by the second switching means, the control device being connected to the first and second switching means.

10. The servo writer according to claim 3,
wherein the first installation section includes a rotatable first turret on which the servo write heads are arranged, and the first switching means switches the servo write heads by rotating the first turret, and
wherein the at least one DC erase head includes at least two DC erase heads and the servo write heads are related to the at least two DC erase heads, and the at least two DC erase heads are arranged on the first turret, so that when one of the servo write heads is positioned at a location possible to write servo signals to the magnetic tape, corresponding one of the at least two DC erase heads is positioned upstream of this servo write head in the running direction of the magnetic tape and at a location possible to DC-erase the servo bands of the magnetic tape.

11. The servo writer according to claim 10,
wherein each of the servo write heads and corresponding one of the DC erase heads are integrated.

12. The servo writer according to claim 3,
wherein the servo write heads on the first installation section are arranged parallel to one another close to a running route of the magnetic tape, and the first switching means moves one of the servo write heads to the running route of the magnetic tape, and puts the other or others of the servo write heads at the standby spot, thereby switching the servo write heads, and
wherein the at least one DC erase head includes at least two DC erase heads and the servo write heads are related to the at least two DC erase heads, and
wherein the at least two DC erase heads are arranged on a second installation section, so that when one of the servo write heads is positioned at a location possible to write the servo signals to the magnetic tape, corresponding one of the at least two DC erase heads is positioned upstream of this servo write head in a running direction of the magnetic tape and at a location possible to DC-erase the servo bands of the magnetic tape.

13. The servo writer according to claim 12,
wherein each of the servo write heads and corresponding one of the at least two DC erase heads are integrated.

14. The servo writer according to claim 3, wherein the at least one DC erase head includes at least two DC erase heads and the at least two DC erase heads are of the same type.

15. The servo writer according to claim 3,
wherein the at least one DC erase head includes at least two DC erase heads and the at least two DC erase heads are of different types, and are related to the individual servo write heads being positioned downstream of the DC erase heads themselves.

16. The servo writer according to claim 1, further comprising an AC erase head for demagnetizing portions other than the servo bands of the magnetic tape, the AC erase head being placed downstream of the servo write heads in the running direction of the magnetic tape.

17. The servo writer of claim 1, wherein the plurality of servo write heads includes servo write heads of different types.

18. The servo writer of claim 1, wherein the plurality of servo write heads are identical.

19. A servo writer comprising:
a magnetic tape running system for running a magnetic tape, the magnetic tape running system comprising a supply reel for feeding the magnetic tape, and a take-up reel for rewinding the magnetic tape;
at least one DC erase head for DC-erasing servo bands of the running magnetic tape in a first direction along a long side of the magnetic tape;
a plurality of servo write heads being positioned downstream of the DC erase head in a running direction of the magnetic tape, the servo write heads for writing servo signals to the servo bands of the magnetic tape by magnetizing the servo bands in a second direction, the second direction being opposite to the first direction; and
an installation section on which the servo write heads are arranged, the installation section comprising a switching means for switching the servo write heads to position one of the servo write heads at a location possible to write the servo signals to the magnetic tape,
wherein the servo write heads on the installation section are arranged parallel to one another at a standby spot close to a running route of the magnetic tape, and
wherein the switching means moves one of the servo write heads to the running route of the magnetic tape, and puts the other or others of the servo write heads at the standby spot, thereby switching the servo write heads.

20. The servo writer according to claim 19, further comprising a plurality of vertical moving devices being related to the servo write heads, each of the vertical moving devices comprising a slider on which one of the servo write heads is mounted, and a plurality of linear guides,
wherein the switching means drives the vertical moving devices to thereby slide the sliders on the linear guides, so that one of the servo write heads moves to the running route of the magnetic tape, while the other or others of the servo write heads are located at the standby spot.

21. A method for writing servo signals to a magnetic tape by a servo writer, the servo writer comprising a magnetic tape running system, a plurality of servo write heads, at least one DC erase head being positioned upstream of the servo write heads, a switching means, and a control device being connected to the switching means, the servo writer writing the servo signals to the magnetic tape by switching the servo write heads, the method comprising:
switching the servo write heads to position the switched one of the servo write heads at a writing location;
setting the magnetic tape to magnetic tape running system;
DC-erasing servo bands of the magnetic tape in a first direction along a long side of the magnetic tape by using the DC erase head, while the magnetic tape running system runs the magnetic tape; and
writing, by using the switched one of the servo write heads, the servo signals to the servo bands of the magnetic tape by magnetizing the servo bands in a second direction, while the magnetic tape running system runs the magnetic tape, the second direction being opposite to the first direction;
wherein the switching means switches the servo write heads, depending on types of the servo write heads, and the control device controls switching of the servo write heads by the switching means.

* * * * *